United States Patent

[11] 3,619,240

| [72] | Inventors | Francois Toussaint<br>Lodelinsart;<br>Maurice Boffe, Fleurus, both of Belgium |
|---|---|---|
| [21] | Appl. No. | 722,381 |
| [22] | Filed | Apr. 18, 1968 |
| [45] | Patented | Nov. 9, 1971 |
| [73] | Assignee | Glaverbel S. A.<br>Watermael-Boitsfort, Belgium |
| [32] | Priorities | Apr. 25, 1967 |
| [33] | | Luxembourg |
| [31] | | 53,509;<br>Apr. 27, 1967, Luxembourg, No. 53,544;<br>Feb. 8, 1968, Great Britain, No. 6,389/68 |

[54] MECHANICALLY STRENGTHENING ARTICLES MADE OF VITREOUS OR CERAMIC MATERIALS
25 Claims, 4 Drawing Figs.

[52] U.S. Cl. .................................................. 117/40,
117/43, 117/62, 117/123, 117/124
[51] Int. Cl. ............................................................. C03c 17/00
[50] Field of Search............................................. 117/123,
124, 125, 40, 43, 62; 65/30

[56] References Cited
UNITED STATES PATENTS

| 2,690,065 | 9/1954 | Harman et al. ............... | 117/43 X |
| 3,222,206 | 12/1965 | Cornelissen et al. ........... | 117/40 X |
| 3,055,762 | 9/1962 | Hoffman ....................... | 117/124 |
| 3,384,508 | 5/1968 | Bopp et al. ..................... | 117/123 |
| 3,415,637 | 12/1968 | Glynn............................ | 65/30 |
| 3,434,817 | 3/1969 | Hazdra et al. .................. | 117/124 X |
| 3,441,398 | 4/1969 | Hess............................... | 65/30 |

Primary Examiner—Alfred L. Leavitt
Assistant Examiner—Wayne F. Cyron
Attorney—Spencer and Kaye ABSTRACT: Processes for increasing the mechanical strength of articles made of glass, vitrocrystalline materials or ceramic materials by coating at least certain surface portions of a base layer with a coating of glass substance having a lower softening temperature and a lower coefficient of thermal expansion than the material of the base layer, the coating material being brought to a temperature which is sufficiently high to place it in at least a softened state and the resulting unit then being cooled to produce compressive stresses in the layer of coating material. Articles composed of a base layer and a coating layer having a lower coefficient of thermal expansion and a lower softening temperature than the base layer, the coating layer having been placed in a softened condition either before or after having been applied to the base layer.

PATENTED NOV 9 1971  3,619,240

INVENTORS.
Francois Toussaint
Maurice Boffe

BY Spencer & Kaye
ATTORNEYS.

MECHANICALLY STRENGTHENING ARTICLES MADE OF VITREOUS OR CERAMIC MATERIALS

BACKGROUND OF THE INVENTION

The present invention relates to vitreous, vitrocrystalline and ceramic products, and particularly to such products having improved mechanical strength.

It is well known that glass is better able to withstand compressive loads than tensile loads, this being primarily due to the fact that a glass surface will have small imperfections or flaws which reduce its ability to withstand tensile stresses. It is also known that the tensile strength of glass can be improved by subjecting it to known thermal tempering processes which have the effect of producing or increasing compressive stresses in the surface layers of the glass.

Thermal tempering involves heating of the glass to a temperature close to its softening point and then rapidly chilling the glass in a current of air. One limitation of known thermal tempering processes is that they can only be carried out in an effective manner on sheet glass having a minimum thickness of about 3 mm.

Thermal tempering processes have other known drawbacks which relate primarily to the requirements imposed on the tempering apparatus by the high temperatures which must be maintained and to various types of defects which can be produced in the glass as a result of having been exposed to the high temperatures of the thermal tempering process

SUMMARY OF THE INVENTION

It is a primary object of the present invention to overcome these limitations.

Another object of the invention is to improve the tensile stress resistance of articles made of glass, vitrocrystalline materials or ceramic materials.

Another object of the invention is to provide an improved technique for increasing the tensile stress resistance of such articles.

A further object of the invention is to increase the tensile strength of such articles without heating them to high temperatures.

These and other objects according to the invention are achieved by a process for treating an article composed of a base layer made of a material selected from the group consisting of glass, vitrocrystalline materials and ceramic materials for increasing its mechanical strength. The process according to the invention is carried out by disposing a glass coating on the base layer, at least on surface portions thereof which are at opposite sides of the base layer median surface, the coating being of a material which softens at a lower temperature, and has a lower coefficient of thermal expansion, than the material of the base layer, the coating being solid at room temperatures. The process further includes heating the coating at least to a temperature which places it in a softened state while on the base layer, and subsequently cooling the coating and the base layer for solidifying the coating and for placing it in a state of compression as a result of the differential thermal contraction of the coating and base layer.

As will become more readily apparent from the detailed description to be presented below, the coating may be heated either before, during or after deposition on the base layer so as to cause it to be at the desired temperature after having been applied to the base layer.

The objects according to the invention are also achieved by an article composed of a base layer made of a material selected from the group consisting of glass, vitrocrystalline materials and ceramic materials, which article also includes a glass coating disposed on the base layer at least on surface portions thereof which are at opposite sides of the base layer median surface. The coating is of a material which is solid at room temperatures and which has a lower softening temperature, and a lower coefficient of thermal expansion, than the base layer, the coating adhering to the base layer and being maintained in a state of compression thereby.

DESCRIPTION OF THE PREFERRED EMBODIMENTS

According to the present invention, a base layer of glass, vitrocrystalline material or ceramic material is coated either entirely or on surface portions which are disposed to respectively opposite sides of the median surface of the base layer, with glass which is in a molten or softened state and which is of a type that softens at a lower temperature, and which has a lower coefficient of thermal expansion, than the material of the base layer, and the unit formed by the coating and the coated base layer is subsequently cooled to cause the coating or coatings to solidify and to be placed under compression as a result of the greater degree of contraction exhibited by the base layer.

The invention also includes a glass or vitrocrystalline material composed of a base layer of glass, vitrocrystalline material or ceramic material, which layer is covered entirely or at zones which are disposed to respectively opposite sides of a median surface of the base layer, with a coating or coatings of glass having a lower thermal expansion coefficient than the material of the base layer, which coating or coatings is or are held by said base layer in a state of compression when the resulting unit is at a temperature lower than that at which the coating is applied.

The expression "median surface" as herein used in relation to the base layer or substrate refers to an imaginary reference surface or plane bisecting the depth or thickness dimension of the base layer. Thus, the median surface of a flat sheet is a surface or plane midway between, and parallel with, the two major surfaces of the sheet.

In general, the best results have been obtained in the practice of the invention with glass coatings having a thickness in the range 1 to 150 microns.

The coated base layer is preferably maintained in its solid state throughout the performance of the process. The following description and explanation of the invention will make reference primarily to materials in sheet form but it is to be understood that the invention includes in its scope materials and processes in which the base layer has some other physical form, for example a tubular form, or constitutes at least part of the wall of a piece of hollowware. It will thus be understood that the base layer need not be flat but can follow a plane of any curvature.

As the term "layer" implies, the coated substrate always has length and width dimensions which are many times as great as its thickness. In most cases, for example when the base layers are constituted by ribbons of drawn glass or sheets into which such ribbons are cut, the length and width dimensions will be hundreds of times as great as the thickness. However, base layers of relatively small size with length and width dimensions of as little as ten times the thickness are not excluded from the purview of the invention.

Figure 1:
FIG. 1 is an elevational, cross-sectional view of one article produced according to the present invention.

FIG. 1 shows one article according to the invention wherein a base layer 1 in the form of a flat sheet is completely covered with a coating layer 2, whose thickness is greatly exaggerated in the drawings for purposes of illustration.

The invention includes processes and materials wherein only part of the base layer is coated with the coating glass because if the material, due to its form or the intended manner of its use, is particularly vulnerable to damage by forces imposed at a particular region or regions thereof, the invention affords advantages even if a coating or coatings under compression is or are provided only at the vulnerable region or regions.

Glass sheets, for example, are particularly susceptible to breakage due to being contacted at their edges with a hard object such as a nail. Their susceptibility to breakage in this way can be substantially reduced by forming glass coatings, in accordance with the invention, on the edges of the sheet and possibly also on the opposed major surfaces of the sheet in marginal regions thereof, for example, in marginal regions having a width of about 1 to 5 mm. or more.

Figure 2:
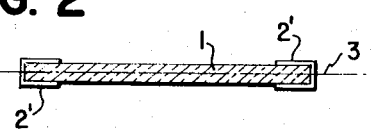
FIG. 2 is a view similar to that of FIG. 1 of another article produced according to the invention.

One such product is shown in FIG. 2 wherein the base layer 1 is coated only long two edges and the adjacent peripheral portions of its large surfaces with layers 2'. FIG. 2 also shows the median surface 3 of the base layer.

In this connection, it should be noted that a coating covering any one edge of a rectangular sheet covers, in effect, two contiguous zones, each of one half the thickness of the sheet, which are disposed to respectively opposite sides of the median surface of the sheet, and the invention includes processes in which only one edge or several edges of the base layer are coated. Coatings along any one margin of a sheet, on its two major faces, are of course also laterally opposed with respect to the median surface of the sheet.

Figure 3:
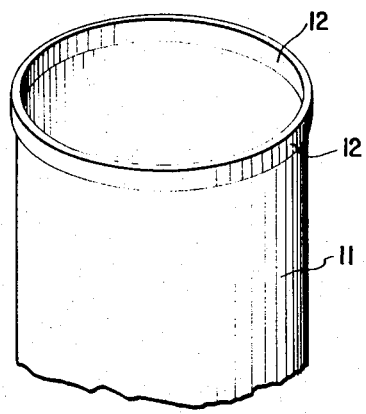
FIG. 3 is a perspective view of a portion of another article according to the invention.

As another example, a tumbler is much more likely to be broken by a slight impact at its rim then by a similar impact on its side. If the rim of such tumbler and/or its inside and outside surfaces in the region adjacent the rim are provided with coatings in accordance with the invention, the tumbler is less likely to break. This is shown in FIG. 3 wherein a tubular member 11, which could be the upper portion of a tumbler or part of any other tubular article, has its rim, and the surface portions adjacent the rim, coated with layers 12.

The invention makes it possible to produce compressive surface stresses considerably higher than can be produced by thermal tempering. Moreover, the magnitude of the stresses and the stress gradient depthwise from the coated surfaces can be readily controlled to conform to predetermined specifications. Another advantage of the invention is that glass coatings in a state of compression can be formed on thin glass sheets less than 3 mm. in thickness as well as on thicker glass sheets.

In general, the degree of strengthening achieved with any given base layer and glass coating will depend on the viscosities of the two elements at the time they are joined together and for maximum results the viscosity of the coating should be as low as possible, and that of the base layer should be as high as possible, taking into consideration the other conditions imposed on the process and the resulting article. In any event, the viscosity of the base layer should not be less than $10^{7.6}$ poises at the time the coating is applied. In other words, the base layer should not be heated beyond its softening point.

Coating glass of the same composition, or at least of the same coefficient of thermal expansion, should normally be used for coating the surfaces or surface portions on opposite sides of the median surface so that the opposed faces of the base layer will be symmetrically stressed by the coatings. It should be noted, however, that if it is desired to impart to a material compressive stresses of different magnitudes on opposite sides of the median surface of the base layer, this can easily be done by using coating glasses having different thermal expansion coefficients for coating respectively opposite surfaces or surface regions.

Coatings on the opposite surfaces of the base layer should normally be substantially coexistence. In other words, it is preferable not to extend the coating on one surface of the sheet to a given region unless the laterally opposed corresponding region on the opposite surface is also coated. However, a small altitude in this respect is quite acceptable even in those cases where the opposed faces of the base layer are to be substantially symmetrically stressed by the coatings.

The composition of the glass used for coating the base layer can be chosen to secondarily impart a tint or other optical effects to the resulting unit.

The coating of the base layer may be achieved by applying glass or a glass-forming composition in molten form onto such layer. For example, the base layer may be immersed or partly immersed in molten coating glass or a glass-forming composition can be supplied in powdered form to an atomizer which melts the powder and sprays the resulting molten substance.

An alternative method of forming the molten glass coatings is to place the coating glass or glass-forming composition, in solid, e.g. particulate, form on the base layer and to then melt the coating material in situ. When proceeding in this manner, it is preferable to melt powdered glass in situ. Certain glass-forming components can be applied in vacuo by evaporation or cathodic volatilization. Glass, or a glass-forming mixture can also be applied as a paste.

A preferred procedure however is to apply glass or a glass-forming mixture in discrete, i.e. particulate, form by coating the base layer with a liquid, for example an organic liquid, containing the particles in suspension, which liquid is subsequently caused to evaporate. The thickness of the resulting solid deposit can be controlled by controlling the degree of concentration of the suspended particles in the liquid vehicle. The liquid containing the suspension can be applied by immersing the base layer, or the part of the base layer to be coated, in such liquid, by spraying, or by any other suitable method.

If the glass or a glass-forming composition is applied to a base layer, or to part of a base layer, by spraying or by an evaporation or volatilization technique, the part of the base layer which is not to be coated can be suitably masked if necessary.

Another method of forming glass coatings is by applying thin preformed coating glass sheets or layers of coating glass to opposed surfaces of the base layer, heating the assembly at least sufficiently to soften the glass of the coating sheets or layers, and then cooling the assembly preferably while maintaining it under pressure. If the material of the base layer is at a relatively low temperature when the coatings are applied, the base layer and coatings can be subsequently heated in a furnace to a temperature above the temperature required for melting or softening the glass coatings, as the case may be, and sufficient to cause the necessary degree of expansion of the coated material. The compressive stresses set up in the glass coatings will depend in part on the degree of contraction of the coated material during the cooling stage and if the greatest possible compressive stresses are to be attained, the said material should be heated to a temperature close to, and preferably a few degrees below, its softening point or the softening point temperature of its vitreous phase or that vitreous phase having the lowest softening point in the case of a vitrocrystalline material.

An alternative method of heating the coated material and the coating is to direct burner flames against the material. This method is particularly suitable if only a part or parts of the base layer, for example marginal portions thereof, is or are to be heated.

It is possible to apply the glass or the glass-forming composition to the base layer, after the latter has been brought to an elevated temperature above the melting or softening temperature of the coating glass. In that case, no subsequent heating is necessary and the base layer need merely be then cooled, provided however that if a glass-forming coating mixture is applied, the elevated temperature must be maintained for a sufficiently long period of time to permit the glass to form.

The strength of a material produced according to the invention can be increased by subjecting it to a chemical tempering process, of a type known per se, in which ions are caused to diffuse into the glass coating from a contacting medium, the nature of the ions and the temperature conditions reigning during the diffusion operation being such that the compressive stresses in the glass coatings are increased.

By way of example, ions can be caused to diffuse into a glass coating, in exchange for sodium ions, at a temperature below the annealing temperature of the glass. If the glass coating contains lithium, the chemical tempering can take place by replacing lithium ions by sodium or potassium ions and the high mobility of the lithium ions encourages such ion exchange. Alternatively, the chemical tempering can be achieved by exchanging lithium ions for sodium ions in the glass coating while the temperature of the glass is maintained above its strain point. The ion exchange process can be performed by immersing the material, with the glass coating already applied, in a bath of a molten salt of an appropriate alkali metal, e.g. molten potassium nitrate.

An important application of the present invention is for strengthening the margins of a glass sheet preparatory to chemically tempering the sheet. After forming coatings of glass on the marginal portions of the large surfaces of the sheet, as hereinbefore referred to, the whole sheet is subjected to a chemical tempering treatment, for example by dipping the sheet in a chemical tempering bath. As a result, the entire sheet will be tempered while the resulting compressive stresses will be greater at the marginal zones than elsewhere. Such a process is of special value if the composition of the glass used for the coating is selected so that this glass is more easily chemically tempered than the glass of the coated sheet.

The following table shows three glass compositions having linear expansion coefficients of less than $10 \times 10^{-6}$ and which can be used in the practice of the invention for coating a glass material, in sheet or other form, having a coefficient of expansion in excess of that value:

| Composition No. | Proportions | | |
|---|---|---|---|
| | 1 | 2 | 3 |
| Ingredients: | | | |
| PbO, percent | 74. | 71.50 | 70.67 |
| B₂O₃, percent | 10. | 13. | 15.40 |
| ZnO, percent | 8. | 9. | 9.47 |
| SiO₂, percent | 2. | 3. | 2.08 |
| BaO, percent | 1. | | |
| CuO, percent | 1. | 3. | 1.88 |
| Bi₂O₃, percent | 2. | | |
| Li₂O, percent | 2. | 0.50 | 0.50 |
| Coefficient of linear expansion | $9.27 \times 10^{-6}$ | $8.25 \times 10^{-6}$ | $8.26 \times 10^{-6}$ |

Any of the above glass compositions can, for instance, be used for coating a glass having the following composition and having a coefficient of thermal expansion of $10.8 \times 10^{-6}$:

| | |
|---|---|
| SiO₂ | 73.08% |
| CaO | 10.33 |
| Na₂O | 15.84 |
| As₂O₃ | 0.15 |
| Al₂O₃ + Fe₂O₃ | 0.60 |

A tableware article in the form of a plate of ceramic-porcelain made from the following composition by weight: ZnO 42%; Al₂O₃ 20%; SiO₂ 35%; P₂O₅ 3%, was coated with glass having the first of the coating compositions presented in the first table above (coefficient of thermal expansion $9.27 \times 10^{-6}$). The coefficient of thermal expansion of the porcelain was $9.54 \times 10^{-6}$ and its softening temperature was in the region of 1,040° C. The coating was applied at 1,000° C. After cooling, the breaking strength of the article was found to be three times as great as that of the uncoated porcelain.

Figure 4:
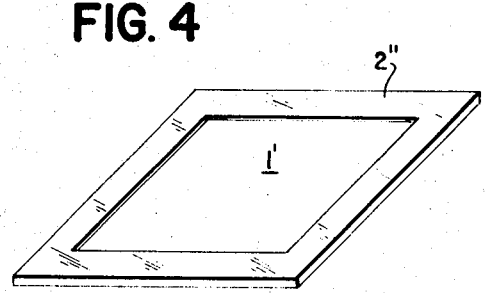
FIG. 4 is a perspective view of yet another article according to the invention.

In another exemplary treatment procedure according to the invention, a glass coating was applied to a ceramic porcelain plate having the same composition as that set forth above, the plate being in the form of a square 30 cm. on a side and 3 mm. thick. The coating was applied only to the lateral edges of the plate and to the peripheral portions of the large surfaces of the plate to a distance of about 5 mm. in from each edge. The coating was identical with the second composition set forth in the first table above, this composition having a linear expansion coefficient of $8.25 \times 10^{-6}$, and the coating was applied by dipping each edge of the plate, and the adjacent peripheral portions of its large surfaces, in succession into a bath of the coating composition at a temperature of 980° C. After cooling, comparative strength tests were carried out on the resulting plate and on an identical plate which had not been provided with a coating. It was determined that the coated plate was far superior to the comparison plate in its ability to withstand shocks (e.g. blows, etc.) applied to its edges. Moreover, the treated plate also had an improved ability to withstand shocks applied to its uncoated portions. The resulting article is shown in FIG. 4 where the plate 1' has layers 2'' along each edge and upon the peripheral surface portions adjacent each edge.

It will be understood that the above description of the present invention is susceptible to various modifications, changes and adaptations and the same are intended to be comprehended within the meaning and range of equivalents of the appended claims.

1. A process for treating an article composed of a base layer having two opposed major surfaces and an edge surface extending between the major surfaces and made of a material selected from the group consisting of glass, vitrocrystalline materials and ceramic materials for increasing its mechanical strength, comprising: applying a glass coating on both major surfaces of the base layer, only on portions thereof which are adjacent the edge surface so as to leave the major portion of each major surface free of the coating, the coating being disposed on the two major surfaces substantially symmetrically with respect to the base layer median surface, the coating being of a material which softens at a lower temperature, and has a lower coefficient of thermal expansion, than the material of the base layer, the coating being solid at room temperatures; heating the coating at least to a temperature which places it in a softened state while on the base layer, which temperature is below the softening temperature of the base layer; subsequently cooling the coating and the base layer for solidifying the coating and for placing it in a state of compression as a result of the differential thermal contraction of the coating and base layer; and subsequently subjecting the article to a diffusion operation for chemically tempering the resulting articles so as to increase the compressive stresses in the glass coating.

2. A process as defined in claim 1 further comprising the step of applying the glass coating to the entire edge surface of the base layer.

3. A process as defined in claim 1 wherein the base layer is in the form of a sheet and said step of applying is carried out so as to cover the portion of each large surface of the sheet which is adjacent at least one part of the edge surface with the glass coating.

4. A process as defined in claim 3 wherein the at least one part of the edge of the surface of the sheet is also covered with the glass coating.

5. A process as defined in claim 1 wherein the median surface of the base layer is flat.

6. A process as defined in claim 1 wherein the median surface of the base layer is curved.

7. A process as defined in claim 6 wherein the base layer constitutes the wall of a piece of hollowware having a rim, and said step of applying is carried out so as to provide a glass coating on the portions of the inside and outside surfaces of this wall which are adjacent the rim.

8. A process as defined in claim 7 wherein the rim of the article is also covered with the glass coating.

9. A process as defined in claim 1 wherein said step of applying a glass coating is carried out by applying molten glass to the base layer.

10. A process as defined in claim 1 wherein said step of applying a glass coating is carried out by applying, in solid form, a material from which the glass coating is to be formed to the base layer, and subsequently placing the material in at least a softened state in situ.

11. A process as defined in claim 10 wherein the material from which the coating is to be formed is constituted by the coating glass.

12. A process as defined in claim 10 wherein the material from which the glass coating is to be formed is constituted by a glass-forming substance and said step of applying a glass coating further includes forming the coating glass from such substance.

13. A process as defined in claim 10 wherein the material from which the glass coating is to be formed is in powder form and is placed in suspension in a liquid for application to the base layer.

14. A process as defined in claim 13 wherein the liquid suspension is applied to the base layer by dipping the layer in a bath of such liquid.

15. A process as defined in claim 13 wherein the suspension is applied to the base layer by spraying.

16. A process as defined in claim 10 wherein the material from which the coating is formed is in powder form and is mixed into a pasty medium for deposition on the base layer.

17. A process as defined in claim 1 wherein said steps of applying a glass coating and heating the coating to a temperature which places it in a softened state are carried out by melting the glass coating material and then applying the molten material to the base layer.

18. A process as defined in claim 17 wherein the molten material is applied by dipping the base layer in a bath thereof.

19. A process as defined in claim 17 wherein the molten material is applied by spraying onto the base layer.

20. A process as defined in claim 1 wherein the step of applying a glass coating is carried out by vacuum deposition onto the base layer of a material from which the coating is to be formed.

21. A process as defined in claim 1 wherein said step of heating the coating to a temperature which places it in a softened state is carried out so as to bring the temperature of the base layer to a value which is close to its softening point.

22. A process as defined in claim 1 wherein the glass coating originally contains sodium or lithium ions and said step of chemically tempering is carried out so as to introduce potassium ions into the coating in exchange for the sodium or lithium ions, the tempering being carried out at a temperature below the annealing temperature of the coating.

23. A process as defined in claim 22 wherein said step of chemically tempering is carried out by immersing the resulting article in molten potassium nitrate.

24. A process as defined in claim 1 wherein said step of chemically tempering is carried out at a temperature above the strain point of the coating and involves the substitution of lithium ions for sodium ions originally present in the coating.

25. A process as defined in claim 1 wherein the coating is of a material which is more easily chemically tempered than is the material of the base layer and said step of subjecting the article to a diffusion operation serves to chemically temper the coating to a greater degree than the base layer.

* * * * *